(12) United States Patent
Hirata et al.

(10) Patent No.: US 7,652,104 B2
(45) Date of Patent: *Jan. 26, 2010

(54) EPOXY RESIN COMPOSITION (75) Inventors: Kei Hirata, Ibaraki (JP); Koji Kitayama, Ibaraki (JP); Mizuho Maeda, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 56 days.

This patent is subject to a terminal disclaimer.

(21) Appl. No.: 10/544,762

(22) PCT Filed: Dec. 25, 2003

(86) PCT No.: PCT/JP03/16667

§ 371 (c)(1),
(2), (4) Date: Aug. 8, 2005

(87) PCT Pub. No.: WO2004/069928

PCT Pub. Date: Aug. 19, 2004

(65) Prior Publication Data

US 2006/0142507 A1    Jun. 29, 2006

(30) Foreign Application Priority Data

Feb. 10, 2003  (JP)  ............................. 2003-032764
Feb. 10, 2003  (JP)  ............................. 2003-032765

(51) Int. Cl.
C08C 19/06  (2006.01)
(52) U.S. Cl. ....................................... 525/383; 525/524
(58) Field of Classification Search ................ 525/524, 525/383
See application file for complete search history.

(56) References Cited

U.S. PATENT DOCUMENTS 3,073,792 A    1/1963   Greenspan (Continued)

FOREIGN PATENT DOCUMENTS

CA    2202275    4/1996

(Continued)

OTHER PUBLICATIONS

Carlo A. Ghilardi et al., "Five-co-ordinate methylmercury and trimethyltin palladium and platinum complexes. X-ray crystal structure of $[N(CH_2CH_2PPh_2)_3Pt(HgMe)]BP_4$", J. Chem. Soc., Chem. Commun., pp. 1686-1688 1989.

(Continued)

*Primary Examiner*—Mark Eashoo
*Assistant Examiner*—Megan McCulley
(74) *Attorney, Agent, or Firm*—Oblon, Spivak, McClelland, Maier & Neustadt, L.L.P.

(57) ABSTRACT

An epoxy resin composition includes (A) an epoxy resin, (B) a curing agent, and (C) an epoxidized polyisoprene (c-1) that contains an epoxy group at 0.15 to 2 meq/g in the molecule and has a number-average molecular weight of 15000 to 200000 or an epoxidized polybutadiene (c-2) that contains an epoxy group at 0.15 to 2 meq/g in the molecule and has a number-average molecular weight of 20000 to 200000. The epoxy resin composition has high heat resistance and reduced internal stress, and can be suitably used in applications such as electronic part materials represented by semiconductor encapsulating materials and adhesives.

20 Claims, 8 Drawing Sheets

U.S. PATENT DOCUMENTS

| | | | |
|---|---|---|---|
| 5,332,783 A * | 7/1994 | Dillman et al. | 525/92 H |
| 5,478,885 A | 12/1995 | Masse | |
| 5,499,409 A | 3/1996 | St. Clair | |
| 6,380,287 B2 * | 4/2002 | Katayama et al. | 524/127 |
| 6,455,112 B1 * | 9/2002 | Ohkuma et al. | 427/504 |
| 2001/0006759 A1 * | 7/2001 | Shipley et al. | 430/280.1 |
| 2006/0074199 A1 * | 4/2006 | Hirata et al. | 525/383 |

FOREIGN PATENT DOCUMENTS

| | | |
|---|---|---|
| EP | 0632074 | 1/1995 |
| GB | 1126610 | 9/1968 |
| JP | 57-180626 | 11/1982 |
| JP | 61-062511 | 3/1986 |
| JP | 8-134135 | 5/1996 |
| JP | 9-512039 | 12/1997 |
| JP | 10-502696 | 3/1998 |
| JP | 2000-26830 | 1/2000 |
| JP | 2001-064483 | 3/2001 |
| JP | 2001064483 A * | 3/2001 |
| JP | 2001-123050 | 5/2001 |
| JP | 2002-249516 | 9/2002 |
| JP | 2006-199886 | 8/2006 |

OTHER PUBLICATIONS

Xigao Jian, et al., "Epoxidation of unsaturated polymers with hydrogen peroxide", Journal of Polymer Science: Part C: Polymer Letters, vol. 28, pp. 285-288 1990.

* cited by examiner

EPOXY RESIN COMPOSITION

FIELD OF THE INVENTION

The present invention relates to an epoxy resin composition. The epoxy resin composition obtained in the invention has high heat resistance and reduced internal stress, and can be suitably used in applications such as electronic part materials represented by semiconductor encapsulating materials and adhesives.

BACKGROUND OF THE INVENTION

Cured products of epoxy resin-based compositions are excellent in adhesion, heat resistance and electrical properties and therefore have widespread uses including electric and electronic part materials such as semiconductor encapsulating materials, adhesives and paints. However, they are inherently less flexible and very brittle, so that accumulation of internal stress at curing is inevitable, resulting in problems such as cracks in cast materials encapsulating electronic parts, adhesion failure in adhesives, and cracks and removal in paints. Meanwhile, properties required in the fields of electronic parts and adhesives are increasingly difficult. Properties such as higher strength and reduced elastic modulus are to be achieved without deteriorating the heat resistance.

To solve the above problems, means proposed for reducing the internal stress at curing include (1) a thermosetting resin composition that essentially contains a polyfunctional epoxy compound, a phenolic compound/formaldehyde condensate, and a polybutadiene derivative having at least one carboxyl group, amino group, hydroxyl group, epoxy group, thiol group or isocyanate group per molecule (JP-A-S57-180626); (2) an epoxy resin composition that contains 0.1 to 5% by mass of a synthetic rubber having an epoxy group at a terminal or in the molecule (JP-A-S61-62511); (3) a toughened epoxy resin composition comprising a curable aromatic and/or a curable cycloaliphatic epoxy resin, a curing agent, and an epoxidized low viscosity polydiene polymer having a specific epoxy content wherein the polydiene polymer preferably has a specific structure (JP-A-H09-512039); and (4) an epoxy resin composition comprising the above toughened epoxy resin composition and a hydroxyl-containing substance (JP-A-H10-502696).

The compositions of (1) to (4) have a common technical idea that the flexibility is imparted by internal plasticizing.

The polybutadiene derivative having at least one carboxyl group, amino group, hydroxyl group, epoxy group, thiol group or isocyanate group per molecule, which is disclosed to be substantially useful in JP-A-S57-180626 (1), is a low-molecular weight polybutadiene having a terminal functional group (Examples disclose molecular weights of 2800, 4600 and 4800). JP-A-S61-62511 (2) describes that the synthetic rubber having an epoxy group at a terminal or in the molecule, which is disclosed to be substantially useful, has a low molecular weight particularly preferably in the range of 700 to 3000 (number-average molecular weights disclosed in Examples range from 700 to 3000), and also describes that the epoxy-having synthetic rubber contains much epoxy groups such that the epoxy equivalent is 190 to 220 (the epoxy number is 5.3 to 4.5 meq/g). Such compositions having a low molecular weight and containing a polybutadiene modified with many functional groups are poor in heat resistance. Further, the epoxy-terminated synthetic rubber, which is generally produced by reaction with epichlorohydrin, contains large amounts of impurities such as by-product chloride ions, so that the epoxy resin composition shows lowered humidity resistance and exhibits a corrosive action when used in contact with metal parts.

The epoxy resin compositions of JP-A-H09-512039 (3) and JP-A-H10-502696 (4) are characterized by being imparted with toughness. The epoxidized low viscosity polydiene polymer, which is disclosed to be substantially useful, is a low-molecular weight block polymer containing a vinyl aromatic hydrocarbon (Examples disclose molecular weights of 4960, 5680, 6000 and 6750). The epoxy number in a particularly preferred embodiment is: (i) in the range of 3.5 to 6 meq/g when the polymer contains the vinyl aromatic hydrocarbon at less than 5%, (ii) in the range of 3 to 6 meq/g when the polymer contains the vinyl aromatic hydrocarbon at 5 to 20%, and (iii) in the range of 1.5 to 6 meq/g when the polymer contains the vinyl aromatic hydrocarbon at greater than 20% (the epoxy numbers disclosed in Examples are from 2.2 to 5.2 meq/g). This control of the contents of the vinyl aromatic hydrocarbon and the epoxy group achieves improved compatibility with the epoxy resin. Such compositions containing the epoxidized low viscosity polydiene polymer display flexibility ascribed to the internal plasticizing, but are yet to be improved in maintenance of heat resistance.

It is therefore an object of the invention to provide an epoxy resin composition that is highly heat resistant, has reduced internal stress, and is imparted with sufficient flexibility such that problems such as cracks and separation in adhesive or paint interfaces resulting from internal stress are prevented.

DISCLOSURE OF THE INVENTION

To achieve the above object, the invention provides an epoxy resin composition comprising (A) an epoxy resin, (B) a curing agent, and (C) an epoxidized polyisoprene (c-1) that contains an epoxy group at 0.15 to 2 meq/g in the molecule and has a number-average molecular weight of 15000 to 200000 (hereinafter the epoxidized polyisoprene (c-1)) or an epoxidized polybutadiene (c-2) that contains an epoxy group at 0.15 to 2 meq/g in the molecule and has a number-average molecular weight of 20000 to 200000 (hereinafter the epoxidized polybutadiene (c-2)).

PREFERRED EMBODIMENTS OF THE INVENTION

The epoxy resin (A) for the epoxy resin composition is not particularly limited as long as it is curable by the curing agent (B). The invention can suitably use epoxy resins containing at least two epoxy groups in the molecule. Specific examples include biphenyl epoxy resins, naphthalene epoxy resins, diphenylether epoxy resins, diphenyl thioether epoxy resins, hydroquinone epoxy resins, biphenyl novolac epoxy resins, cresol novolac epoxy resins, phenol novolac epoxy resins, bisphenol A novolac epoxy resins, trisphenol epoxy resins, tetraphenylolethane epoxy resins, dicyclopentadiene epoxy resins, bisphenol A epoxy resins and bisphenol F epoxy resins. These epoxy resins may be used singly or in combination of two or more kinds.

The curing agent (B) for the epoxy resin composition is preferably a phenolic resin having at least two phenolic hydroxyl groups in the molecule. Specific examples include phenol novolac resins, resole phenolic resins, phenol aralkyl resins, triphenol alkane resins and polymers thereof, naphthalene ring-containing phenolic resins and dicyclopentadiene-modified phenolic resins. The curing agent (B) is preferably used in an amount of 20 to 250 parts by mass, and more preferably 20 to 125 parts by mass per 100 parts by mass of the epoxy resin (A). When the amount of the curing agent (B) is less than 20 parts by mass per 100 parts by mass of the epoxy resin (A), the epoxy resin composition tends to give a cured product having a high content of unreacted epoxy resin (A). The amount exceeding 250 parts by mass tends to increase the unreacted content of the curing agent (B).

The epoxidized polyisoprene (c-1) for the epoxy resin composition contains an epoxy group at 0.15 to 2 meq/g in the molecule and has a number-average molecular weight of 15000 to 200000. The epoxidized polybutadiene (c-2) for the epoxy resin composition contains an epoxy group at 0.15 to 2 meq/g in the molecule and has a number-average molecular weight of 20000 to 200000. When the epoxidized polyisoprene (c-1) or the epoxidized polybutadiene (c-2) has an epoxy group content of less than 0.15 meq/g, it shows low compatibility with the epoxy resin (A), and the epoxy resin composition gives a cured product that suffers marked bleed-out of the epoxidized polyisoprene (c-1) or the epoxidized polybutadiene (c-2). On the other hand, the content exceeding 2 meq/g leads to a cured product in which the epoxidized polyisoprene (c-1) or the epoxidized polybutadiene (c-2) has dense crosslinking points, so that the cured product tends to lose the rubber elasticity and becomes very brittle.

When the number-average molecular weight is less than 15000 for the epoxidized polyisoprene (c-1) or less than 20000 for the epoxidized polybutadiene (c-2), the epoxy resin composition gives a cured product that suffers marked bleed-out of the epoxidized polyisoprene (c-1) or the epoxidized polybutadiene (c-2). On the other hand, when the epoxidized polyisoprene (c-1) or the epoxidized polybutadiene (c-2) has a number-average molecular weight exceeding 200000, the viscosity is so increased that the workability in preparation of the epoxy resin composition is deteriorated.

As used herein, the number-average molecular weight is in terms of polystyrene according to gel permeation chromatography (GPC).

The epoxidized polyisoprene (c-1) or the epoxidized polybutadiene (c-2) is preferably used in an amount of 1 to 40 parts by mass, and more preferably 5 to 25 parts by mass per 100 parts by mass of the epoxy resin (A). When the amount of the epoxidized polyisoprene (c-1) or the epoxidized polybutadiene (c-2) is less than 1 part by mass per 100 parts by mass of the epoxy resin (A), the epoxy resin composition tends to give a cured product having insufficient flexibility. When the amount exceeds 40 parts by mass, the epoxy resin composition tends to give a cured product that suffers bleedout of the epoxidized polyisoprene (c-1) or the epoxidized polybutadiene (c-2).

There is particularly no limitation on the process for producing polyisoprene and polybutadiene that are the materials of the epoxidized polyisoprene (c-1) and the epoxidized polybutadiene (c-2) respectively. For example, anionic polymerization and Ziegler processes can be used. The anionic polymerization may be performed in an inert gas atmosphere such as argon or nitrogen, in a solvent inactive in the polymerization such as hexane, cyclohexane, benzene or toluene, with use of an initiator such as an alkali metal (e.g., metallic sodium or metallic lithium) or an alkyllithium compound (e.g., methyllithium, ethyllithium, n-butyllithium or s-butyllithium), at a polymerization temperature of −100 to 100° C., and over a period of 0.01 to 200 hours.

Subsequently, the polyisoprene or polybutadiene obtained is epoxidized at a carbon-carbon double bond in the molecular chain to give an epoxidized polyisoprene (c-1) or an epoxidized polybutadiene (c-2). The process of epoxidation is not particularly limited, and exemplary processes include (i) treatment with a peracid such as peracetic acid (JP-A-H08-134135), (ii) treatment with a molybdenum complex and t-butylhydroperoxide (J. Chem. Soc., Chem. Commun., P. 1686 (1989)), (iii) treatment with a tungstic acid catalyst and hydrogen peroxide (J. Polym. Sci., C, Vol. 28, P. 285 (1990)), and (iv) treatment with a tungsten compound selected from ammonium tungstate and phosphotungstic acid, a quaternary ammonium salt, phosphoric acid, and an aqueous hydrogen peroxide solution (JP-A-2002-249516).

The epoxy resin composition may contain a curing accelerator and/or an inorganic filler while still satisfying the object and effect of the invention.

The curing accelerators include phosphines such as triphenylphosphine, tris(dimethoxyphenyl)phosphine and dibutylphenylphosphine; and amines such as diethylenetriamine, triethylenetetramine and tetraethylenepentamine. The amount in which the curing accelerator is added is not particularly limited as long as the accelerator provides an effect of fast curing. Preferably, the amount is in the range of 0.005 to 2% by mass relative to the total mass of the components of the epoxy resin composition, i.e., the epoxy resin (A), the curing agent (B), and the epoxidized polyisoprene (c-1) or the epoxidized polybutadiene (c-2)

The inorganic fillers include molten silica, crystalline silica, glass and alumina. The inorganic fillers improve the hygroscopicity, thermal conductivity and mechanical strength of the epoxy resin composition. Further, the addition of the inorganic fillers reduces the coefficient of linear expansion of epoxy resin that is higher than that of metals, and thereby enables reduction of cracks and separation caused by temperature change when the composition is formed to encapsulate semiconductors. The amount of the inorganic filler is not particularly restricted and may be varied depending on the application. For example, when the inorganic filler is added to the semiconductor encapsulating epoxy resin composition, the amount is preferably in the range of 70 to 90% by mass relative to the total mass of the components of the epoxy resin composition, i.e., the epoxy resin (A), the curing agent (B), the epoxidized polyisoprene (c-1) or the epoxidized polybutadiene (c-2), and the curing accelerator and the inorganic filler.

The epoxy resin composition may be prepared by use of any means capable of homogeneously dispersing and mixing the epoxy resin (A), the curing agent (B), the epoxidized polyisoprene (c-1) or the epoxidized polybutadiene (c-2), and the optional curing accelerator and inorganic filler. For example, the specified amounts of the materials may be sufficiently mixed with a mixer and thereafter be melt-kneaded in a mixing mill or an extruder, followed by cooling and pulverizing. Transfer molding is a process of choice for thermally curing the epoxy resin composition into a formed product, but injection molding and compression molding are also employable.

The epoxy resin composition according to the present invention is a material that is highly heat resistant, has reduced internal stress, and possesses low elastic modulus while ensuring flexural strength. Accordingly, the epoxy resin composition can be suitably used in applications such as electronic part materials represented by semiconductor encapsulating materials and adhesives.

EXAMPLES

The present invention will be hereinafter described in greater detail by Examples, but it should be construed that the invention is in no way limited to those Examples. The epoxy resin compositions in Examples and Comparative Examples were evaluated for properties as described below.

(a) Flexural Rupture Strength and Flexural Modulus

Test specimens 100 mm long by 10 mm wide by 3 mm thick were prepared from the epoxy resin compositions obtained in Examples and Comparative Examples, and were tested at room temperature in accordance with JIS K 6911.

(b) Dynamic Viscoelasticity

Test specimens 50 mm long by 5 mm wide by 0.5 mm thick were prepared from the epoxy resin compositions obtained in Examples and Comparative Examples, and were tested for the temperature dependence of storage elastic modulus (E') at a frequency of 11 Hz and a temperature of 30 to 250° C. with RHEOVIBRON DDV-III (manufactured by ORIENTEC CO., LTD.)

The components employed in Examples and Comparative Examples are the following.

Epoxy Resin (A)

EPICLON N-665 (trade name): cresol novolac epoxy resin (manufactured by DAINIPPON INK AND CHEMICALS INC., epoxy number: 4.7 to 5.0 meq/g, softening point: 64-72° C.)

Curing Agent (B)

PHENOLITE TD-2131 (trade name): phenol novolac resin (manufactured by DAINIPPON INK AND CHEMICALS INC., hydroxyl number: 9.7 meq/g, softening point: 80±2° C.)

Epoxidized Polyisoprene (c-1)

Reference Example 1

(1) A 5-liter autoclave purged with nitrogen was charged with 2000 g of hexane and 2.5 g of n-butyllithium, followed by heating to 50° C. Subsequently, 650 g of isoprene was added and polymerization was carried out for 3 hours. Part of the reaction liquid was sampled to analyze the product by GPC, which showed that a polyisoprene had occurred which had a number-average molecular weight (Mn) of 27000 in terms of polystyrene, and a weight-average molecular weight (Mw) to number-average molecular weight (Mn) ratio (Mw/Mn) of 1.16.

(2) 300 g of the polymerization solution obtained in (1) above was washed with water and was introduced into a 1-liter autoclave. Further, 0.02 g of phosphotungstic acid, 0.02 g of phosphoric acid, 1.4 g of a 35% by mass aqueous solution of hydrogen peroxide, 90 g of water and 0.03 g of trioctylmethylammonium chloride were added, and reaction was performed at 80° C. for 3 hours. The resulting reaction liquid was poured into methanol to reprecipitate the polymer, and the polymer was filtered out and was vacuum dried at 80° C. for 7 hours to give 70 g of an epoxidized polyisoprene (hereinafter abbreviated to e-IR-1). GPC analysis of e-IR-1 resulted in Mn=27000 and Mw/Mn=1.16. Approximately 0.5 g of e-IR-1 was weighed out and was dissolved in 10 ml of tetrahydrofuran (THF) at 25° C. The solution was combined with 10 ml of a solution of 0.2N hydrochloric acid in THF, and the mixture was stirred for 30 minutes to perform reaction of the epoxy group in e-IR-1 with the hydrochloric acid. The excess of hydrochloric acid was titrated using a solution of 0.1N potassium hydroxide in ethanol to determine the epoxy number to be 0.15 meq/g. (This process will be hereinafter referred to as the back titration of hydrochloric acid.)

Reference Example 2

300 g of a polyisoprene solution obtained in the same manner as in Reference Example 1 (1) was washed with water and was introduced into a 1-liter autoclave. Further, 0.05 g of phosphotungstic acid, 0.05 g of phosphoric acid, 4.5 g of a 35% by mass aqueous solution of hydrogen peroxide, 90 g of water and 0.09 g of trioctylmethylammonium chloride were added, and reaction was performed at 80° C. for 3 hours. The resulting reaction liquid was poured into methanol to reprecipitate the polymer, and the polymer was filtered out and was vacuum dried at 80° C. for 7 hours to give 70 g of an epoxidized polyisoprene (hereinafter abbreviated to e-IR-2). GPC analysis of e-IR-2 resulted in Mn=27300 and Mw/Mn=1.16. The back titration of hydrochloric acid was carried out in the same manner as in Reference Example 1 (2), and the epoxy number of e-IR-2 was determined to be 0.5 meq/g.

Reference Example 3

300 g of a polyisoprene solution obtained in the same manner as in Reference. Example 1 (1) was washed with water and was introduced into a 1-liter autoclave. Further, 0.27 g of phosphotungstic acid, 0.25 g of phosphoric acid, 22 g of a 35% by mass aqueous solution of hydrogen peroxide, 90 g of water and 0.43 g of trioctylmethylammonium chloride were added, and reaction was performed at 80° C. for 3 hours. The resulting reaction liquid was poured into methanol to reprecipitate the polymer, and the polymer was filtered out and was vacuum dried at 80° C. for 7 hours to give 70 g of an epoxidized polyisoprene (hereinafter abbreviated to e-IR-3). GPC analysis of e-IR-3 resulted in Mn=28000 and Mw/Mn=1.18. The back titration of hydrochloric acid was carried out in the same manner as in Reference Example 1 (2), and the epoxy number of e-IR-3 was determined to be 2.4 meq/g.

Epoxidized Polybutadiene (c-2)

Reference Example 4

(1) A 5-liter autoclave purged with nitrogen was charged with 2000 g of hexane and 2.5 g of n-butyllithium, followed by heating to 50° C. Subsequently, 660 g of butadiene was added and polymerization was carried out for 3 hours. Part of the reaction liquid was sampled to analyze the product by GPC, which showed that a polybutadiene had occurred which had a number-average molecular weight (Mn) of 35000 in terms of polystyrene, and a weight-average molecular weight (Mw) to number-average molecular weight (Mn) ratio (Mw/Mn) of 1.02.

(2) 300 g of the polymerization solution obtained in (1) above was washed with water and was introduced into a 1-liter autoclave. Further, 0.03 g of phosphotungstic acid, 0.03 g of phosphoric acid, 1.4 g of a 35% by mass aqueous solution of hydrogen peroxide, 90 g of water and 0.06 g of trioctylmethylammonium chloride were added, and reaction was performed at 80° C. for 3 hours. The resulting reaction liquid was poured into methanol to reprecipitate the polymer, and the polymer was filtered out and was vacuum dried at 80° C. for 7 hours to give 70 g of an epoxidized polybutadiene (hereinafter abbreviated to e-BR-1). GPC analysis of e-BR-1 resulted in Mn=35000 and Mw/Mn=1.02. The back titration of hydrochloric acid was carried out in the same manner as in Reference Example 1 (2), and the epoxy number of e-BR-1 was determined to be 0.16 meq/g.

Reference Example 5

300 g of a polybutadiene solution obtained in the same manner as in Reference Example 4 (1) was washed with water and was introduced into a 1-liter autoclave. Further, 0.11 g of phosphotungstic acid, 0.11 g of phosphoric acid, 4.6 g of a 35% by mass aqueous solution of hydrogen peroxide, 90 g of water and 0.19 g of trioctylmethylammonium chloride were added, and reaction was performed at 80° C. for 3 hours. The resulting reaction liquid was poured into methanol to reprecipitate the polymer, and the polymer was filtered out and was vacuum dried at 80° C. for 7 hours to give 70 g of an epoxidized polybutadiene (hereinafter abbreviated to e-BR-2). GPC analysis of e-BR-2 resulted in Mn=35300 and Mw/Mn=1.02. The back titration of hydrochloric acid was carried out in the same manner as in Reference Example 1 (2), and the epoxy number of e-BR-2 was determined to be 0.52 meq/g.

Example 1

A metal vessel equipped with a heating device, a stirrer and a thermometer was charged with 60 parts by mass of the epoxy resin (A), 30 parts by mass of the curing agent (B), 9 parts by mass of e-IR-1 obtained in Reference Example 1, and 1 part by mass of curing accelerator triphenylphosphine. They were melt-kneaded at 110° C. for 15 minutes to give an epoxy resin composition. The epoxy resin composition was poured into a mold and was compression molded at 180° C. for 2 minutes. From the thus-cured product, test specimens were prepared and were evaluated for properties by the aforementioned methods. The flexural rupture strength and flexural modulus are shown in Table 1.

Example 2

An epoxy resin composition was produced and was evaluated for properties by the procedure of Example 1, except that e-IR-1 was replaced with 9 parts by mass of e-IR-2 obtained in Reference Example 2. The results are shown in Table 1.

Example 3

An epoxy resin composition was produced and was evaluated for properties by the procedure of Example 1, except that e-IR-1 was replaced with 9 parts by mass of e-BR-1 obtained in Reference Example 4. The results are shown in Table 1.

Example 4

An epoxy resin composition was produced and was evaluated for properties by the procedure of Example 1, except that e-IR-1 was replaced with 9 parts by mass of e-BR-2 obtained in Reference Example 5. The results are shown in Table 1.

Comparative Example 1

An epoxy resin composition was produced and was evaluated for properties by the procedure of Example 1, except that e-IR-1 was not used. The results are shown in Table 1.

Comparative Example 2

An epoxy resin composition was produced and was evaluated for properties by the procedure of Example 1, except that e-IR-1 was replaced with 9 parts by mass of the polyisoprene obtained in Reference Example 1 (1) (number-average molecular weight (Mn)=27000). The results are shown in Table 1.

Comparative Example 3

An epoxy resin composition was produced and was evaluated for properties by the procedure of Example 1, except that e-IR-1 was replaced with 9 parts by mass of e-IR-3 obtained in Reference Example 3. The results are shown in Table 1.

Comparative Example 4

An epoxy resin composition was produced and was evaluated for properties by the procedure of Example 1, except that e-IR-1 was replaced with 9 parts by mass of a terminal carboxyl-modified nitrile rubber (HYCAR CT POLYMER CTBN 1300×13 (trade name), manufactured by UBE INDUSTRIES, LTD., Mn=7700, Mw=15600). The results are shown in Table 1.

Comparative Example 5

An epoxy resin composition was produced and was evaluated for properties by the procedure of Example 1, except that e-IR-1 was replaced with 9 parts by mass of an epoxidized polybutadiene (E-1000-8.0 (trade name), manufactured by NIPPON PETROCHEMICALS COMPANY, LIMITED, Mn=40, Mw=4200, epoxy number: 5.0 meq/g). The results are shown in Table 1.

Comparative Example 6

An epoxy resin composition was produced and was evaluated for properties by the procedure of Example 1, except that e-IR-1 was replaced with 9 parts by mass of an epoxidized polybutadiene (E-1800-6.5 (trade name), manufactured by NIPPON PETROCHEMICALS COMPANY, LIMITED, Mn=120, Mw=9200, epoxy number: 4.1 meq/g). The results are shown in Table 1.

Comparative Example 7

An epoxy resin composition was produced and was evaluated for properties by the procedure of Example 3, except that e-BR-1 was replaced with 9 parts by mass of the polybutadiene obtained in Reference Example 4 (1) (number-average molecular weight (Mn)=35000). The results are shown in Table 1.

TABLE 1

| | Component | Flexural rupture strength (MPa) | Flexural modulus (MPa) |
|---|---|---|---|
| Ex. 1 | e-IR-1 | 85 | 2480 |
| Ex. 2 | e-IR-2 | 88 | 2560 |
| Ex. 3 | e-BR-1 | 73 | 2620 |
| Ex. 4 | e-BR-2 | 82 | 2560 |
| Comp. Ex. 1 | — | 69 | 3260 |
| Comp. Ex. 2 | Polyisoprene | 71 | 2590 |
| Comp. Ex. 3 | e-IR-3 | 65 | 2570 |
| Comp. Ex. 4 | HYCAR CT POLYMER CTBN 1300x13 (trade name) | 90 | 2740 |

TABLE 1-continued

|  | Component | Flexural rupture strength (MPa) | Flexural modulus (MPa) |
|---|---|---|---|
| Comp. Ex. 5 | E-1000-8.0 (trade name) | 78 | 3100 |
| Comp. Ex. 6 | E-1800-6.5 (trade name) | 63 | 2670 |
| Comp. Ex. 7 | Polybutadiene | 61 | 2490 |

Compounding ratio (by mass) of components of the epoxy resin composition
Epoxy resin (A): Curing agent (B): Component:Triphenylphosphine = 60:30:9:1

Curves of E' measurements obtained by dynamic viscoelasticity measurements are shown in the attached drawings.

Table 1 shows that the epoxy resin compositions (Examples 1 to 4) that contained the epoxidized polyisoprene (c-1) or the epoxidized polybutadiene (c-2) having the epoxy number specified in the invention gave cured products with higher flexural rupture strength and lower elastic modulus. This indicates the epoxy resin compositions obtained had adequate flexibility and high strength.

On the other hand, the epoxy resin composition of Comparative Example 1 containing no epoxidized polyisoprene (c-1) or epoxidized polybutadiene (c-2) gave a cured product having low flexural rupture strength and high flexural modulus. This indicates the cured product of the Comparative Example 1 epoxy resin composition had poor flexibility and was brittle. Further, the addition of the unmodified polyisoprene, the epoxidized polyisoprene having an epoxy number outside the scope of the invention, and the unmodified polybutadiene (Comparative Examples 2, 3 and 7) achieved lower elastic modulus but resulted in insufficient flexural rupture strength. The addition of the terminal carboxyl-modified nitrile rubber (CTBN) (Comparative Example 4) increased the flexural rupture strength but resulted in insufficient elastic modulus. Furthermore, the use of the epoxidized polybutadienes having an epoxy number outside the scope of the invention (Comparative Examples 5 and 6) resulted in insufficient flexural rupture strength and flexural modulus.

In FIGS. 1 to 8, the temperatures at which E' starts a sharp fall are the softening starting points, namely indicators of heat resistance, of the cured products of the Example and Comparative Example epoxy resin compositions.

Figure 1:
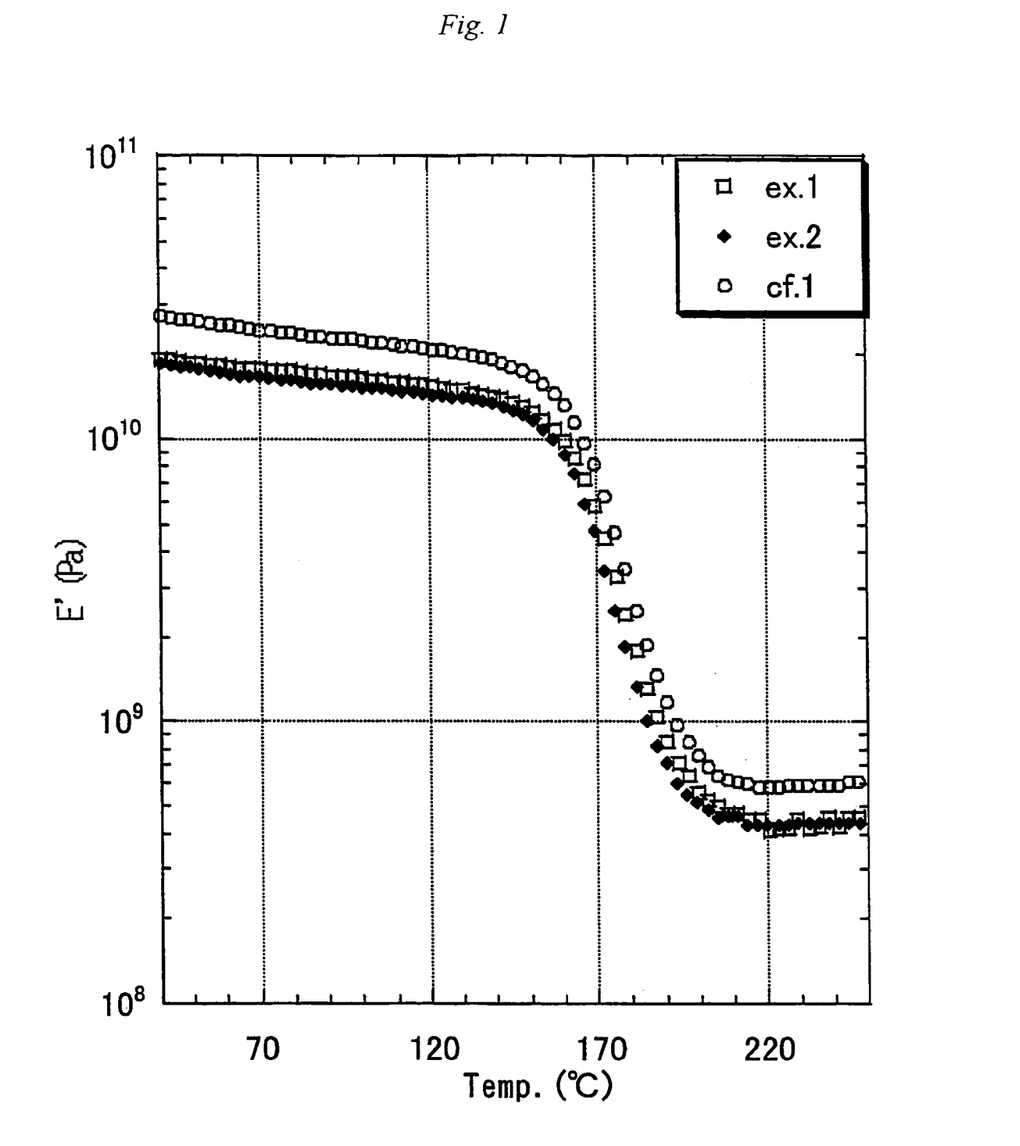
FIG. 1 collectively shows E' of cured products of the three epoxy resin compositions obtained in Examples 1 and 2 and Comparative Example 1.
Figure 5:
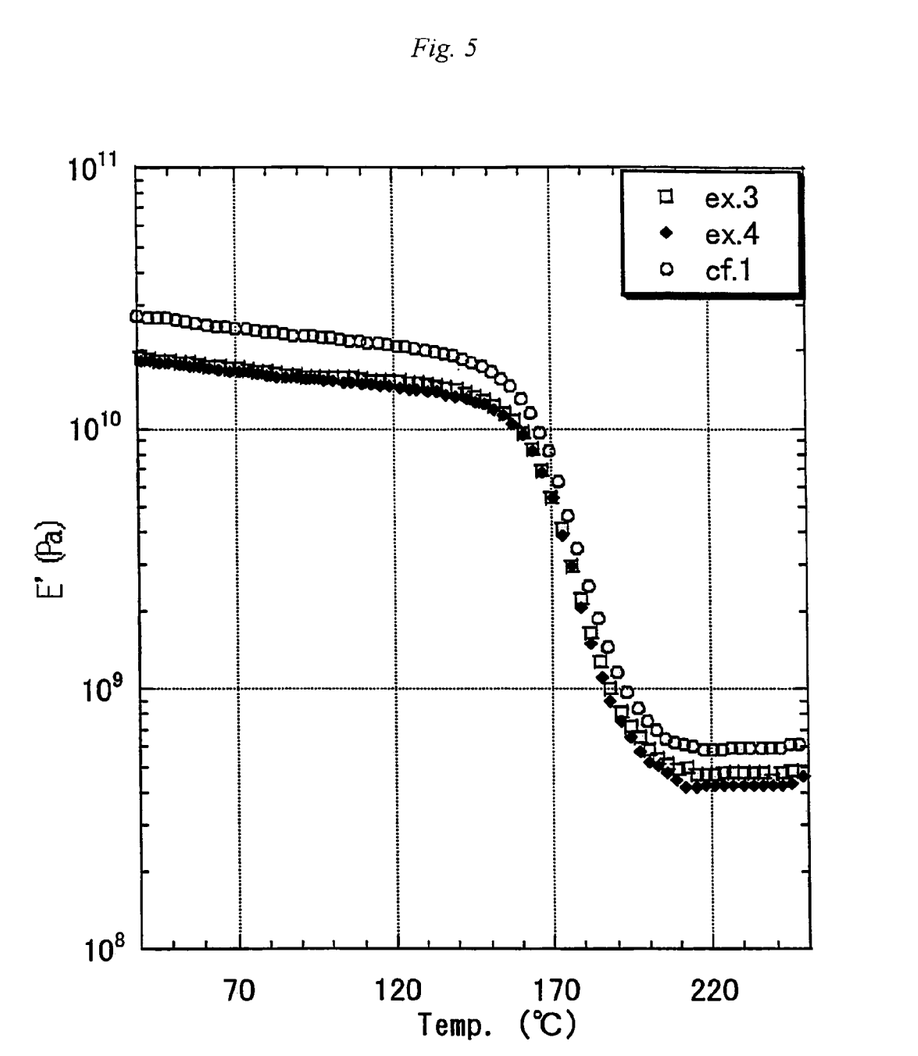
FIG. 5 collectively shows E' of cured products of the three epoxy resin compositions obtained in Examples 3 and 4 and Comparative Example 1.

FIGS. 1 and 5 show the cured products of the epoxy resin compositions of Examples 1 to 4, which contained the epoxidized polyisoprene (c-1) or the epoxidized polybutadiene (c-2) having the epoxy number specified in the invention, maintained E' at up to nearly 150° C. similarly to the cured product of the epoxy resin composition of Comparative Example 1 containing no epoxidized polyisoprene (c-1) or epoxidized polybutadiene (c-2). These results prove the cured product maintained the heat resistance.

Figure 2:
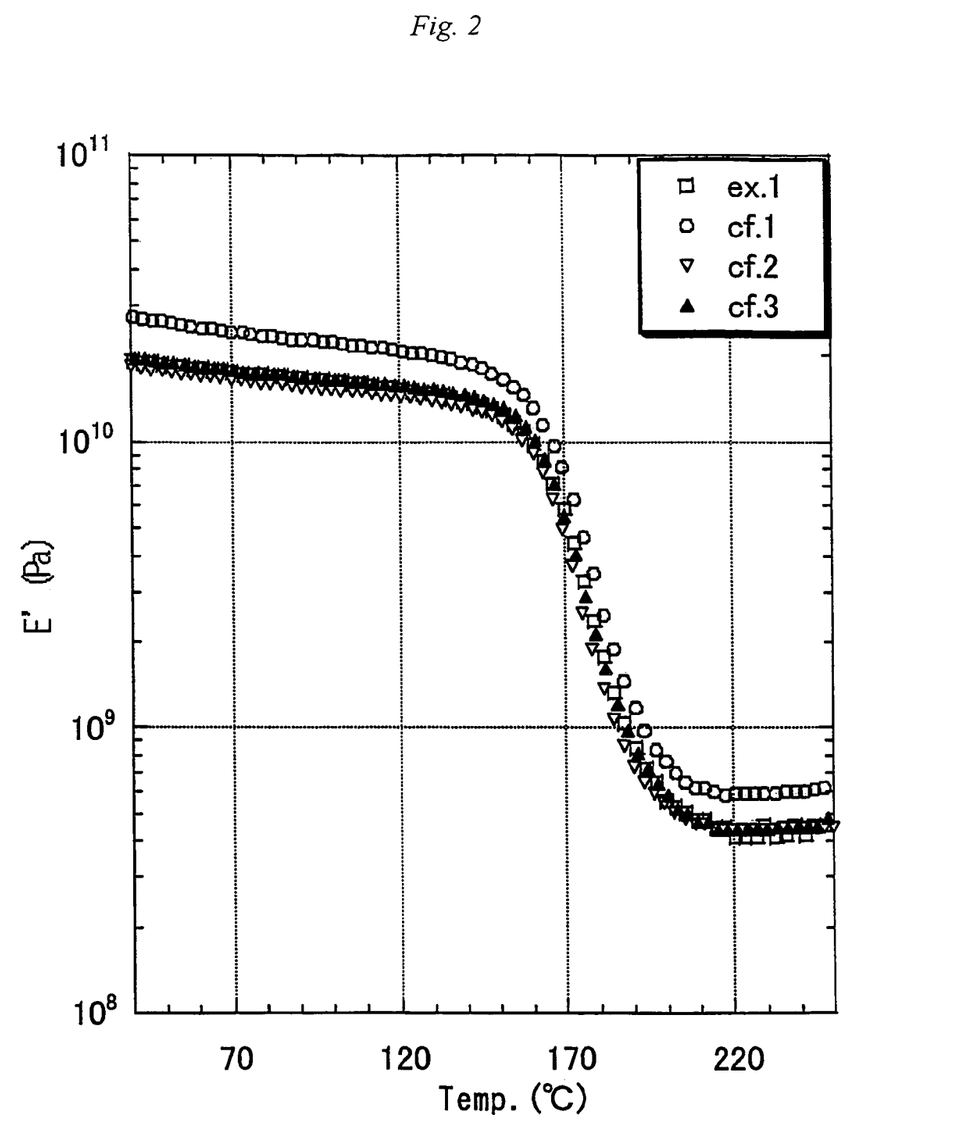
FIG. 2 collectively shows E' of cured products of the four epoxy resin compositions obtained in Example 1 and Comparative Examples 1, 2 and 3.
Figure 3:
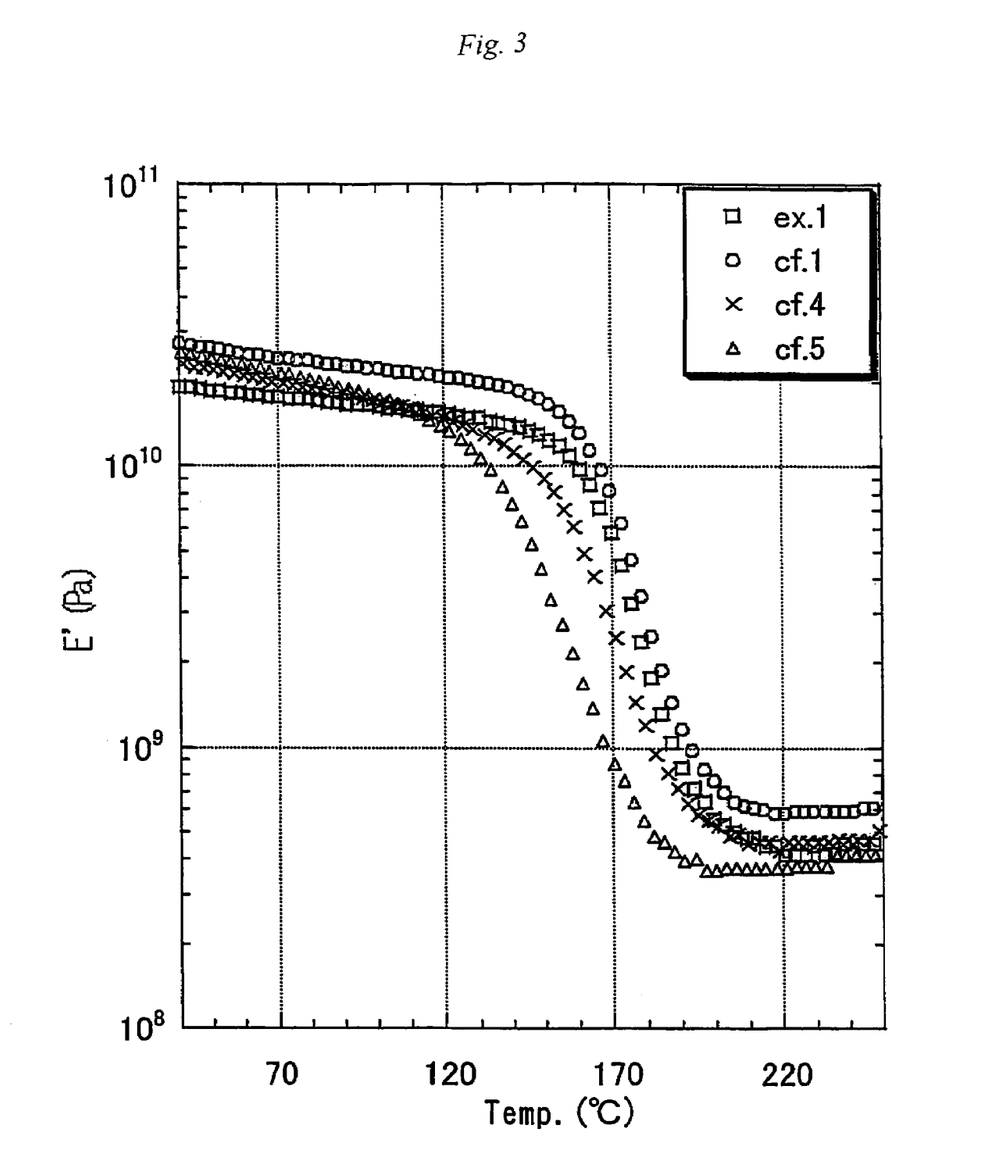
FIG. 3 collectively shows E' of cured products of the four epoxy resin compositions obtained in Example 1 and Comparative Examples 1, 4 and 5.
Figure 4:
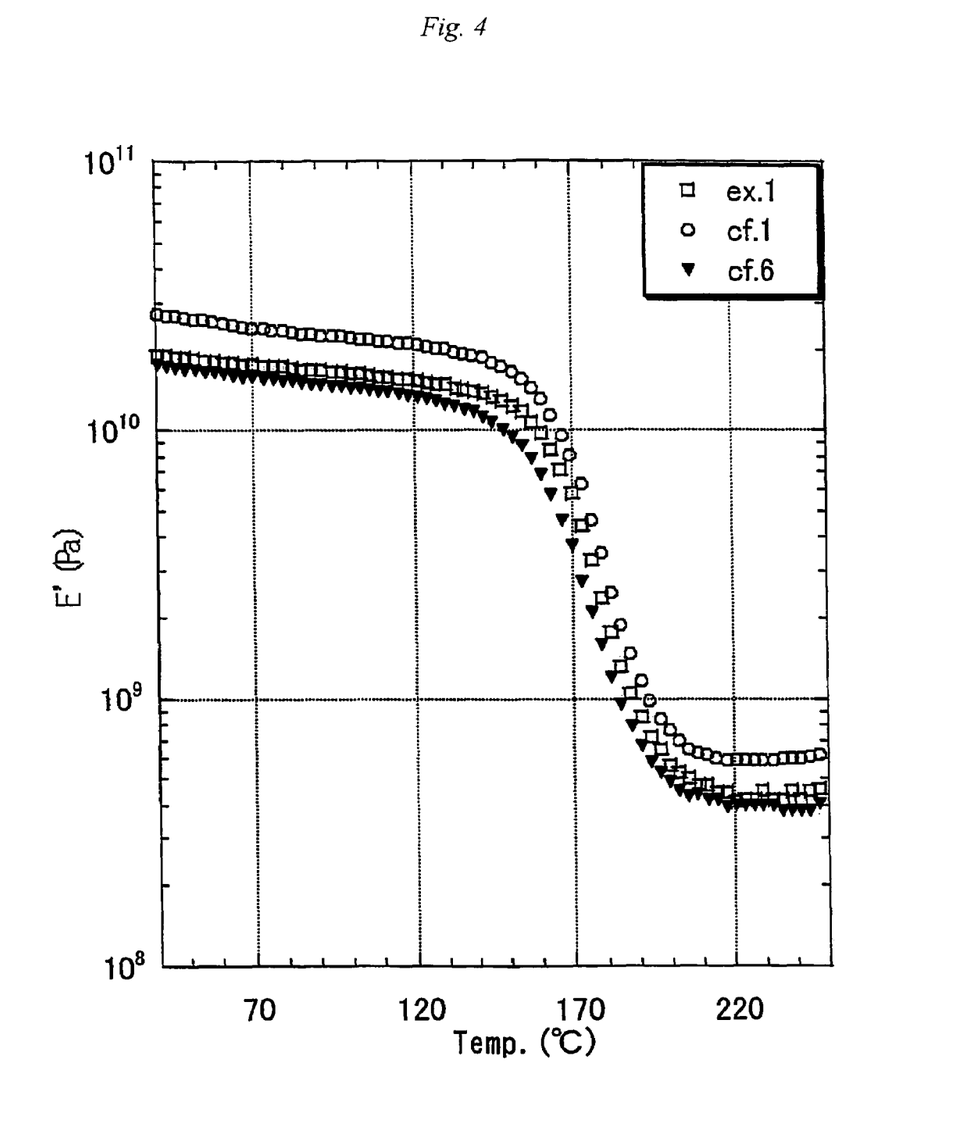
FIG. 4 collectively shows E' of cured products of the three epoxy resin compositions obtained in Example 1 and Comparative Examples 1 and 6.
Figure 6:
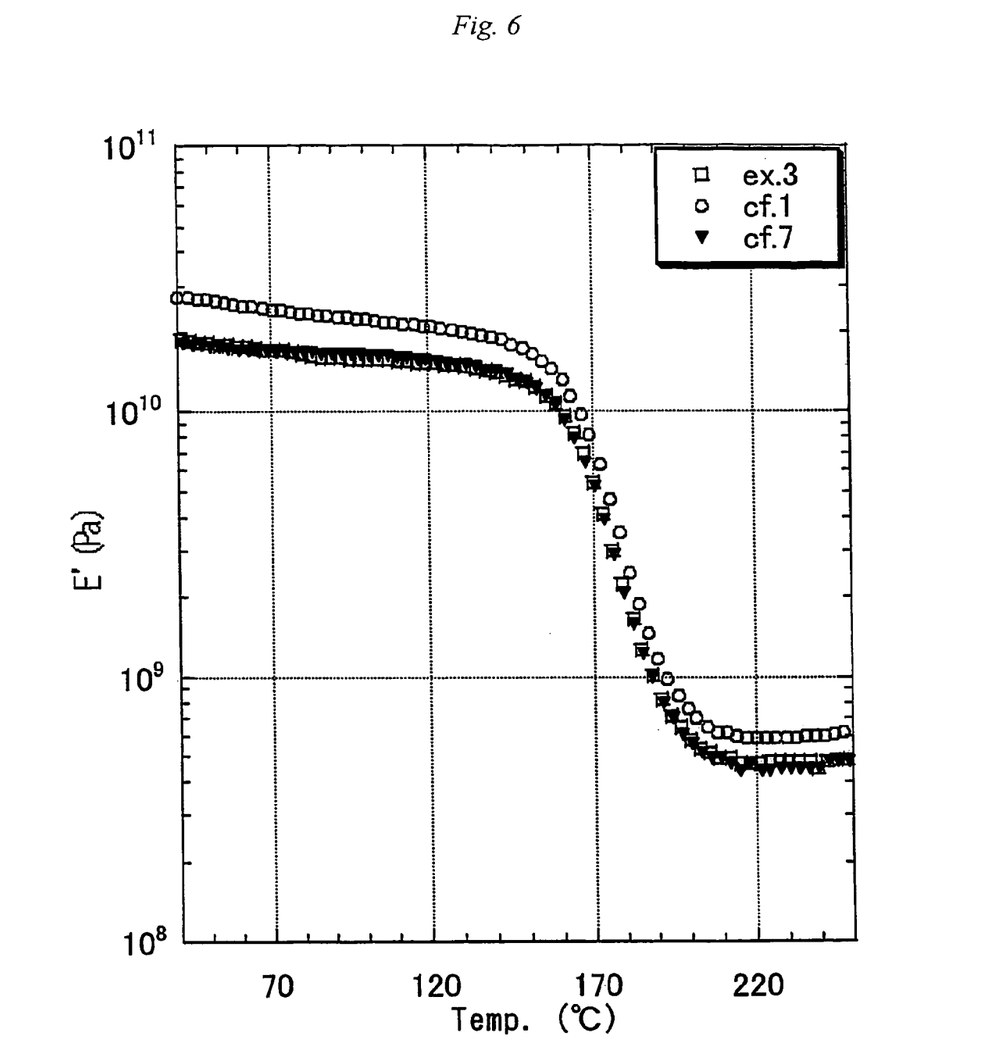
FIG. 6 collectively shows E' of cured products of the three epoxy resin compositions obtained in Example 3 and Comparative Examples 1 and 7.
Figure 7:
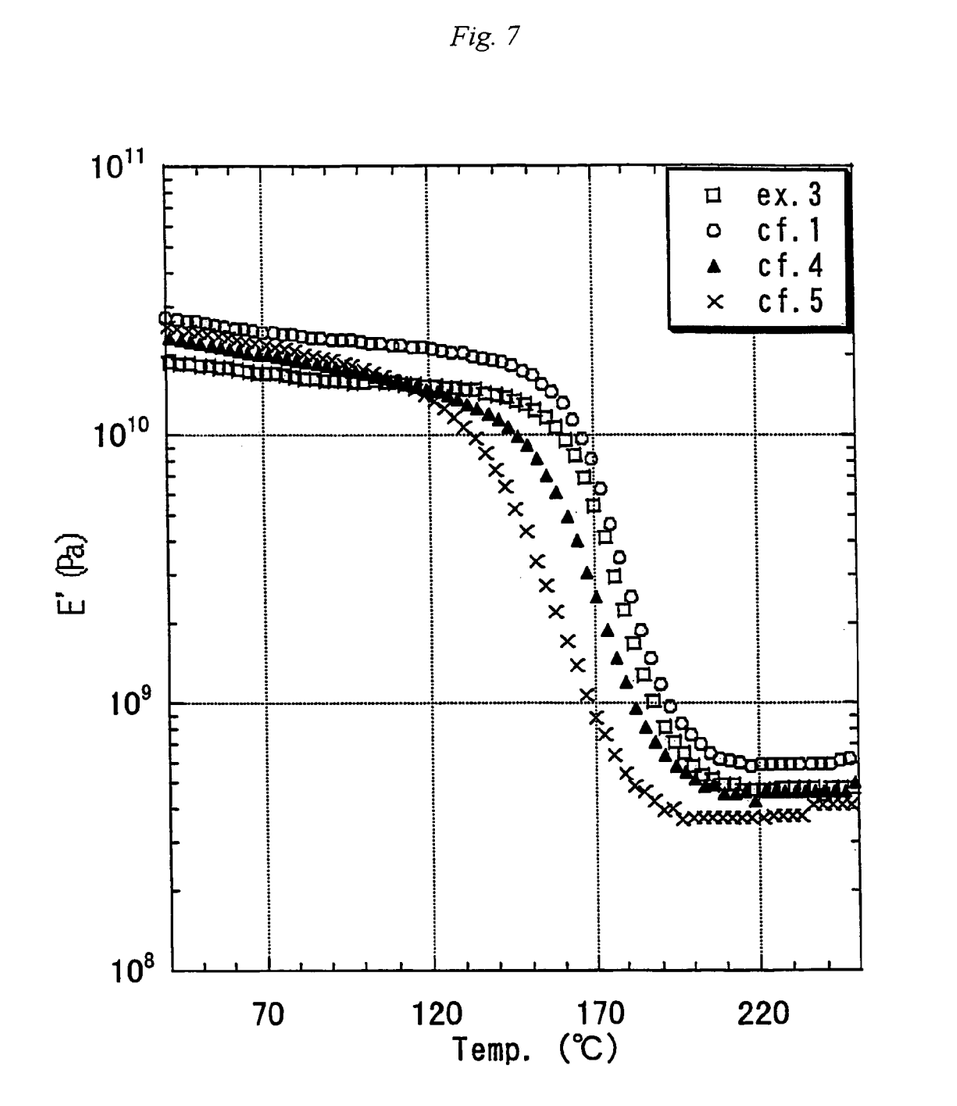
FIG. 7 collectively shows E' of cured products of the four epoxy resin compositions obtained in Example 3 and Comparative Examples 1, 4 and 5.
Figure 8:
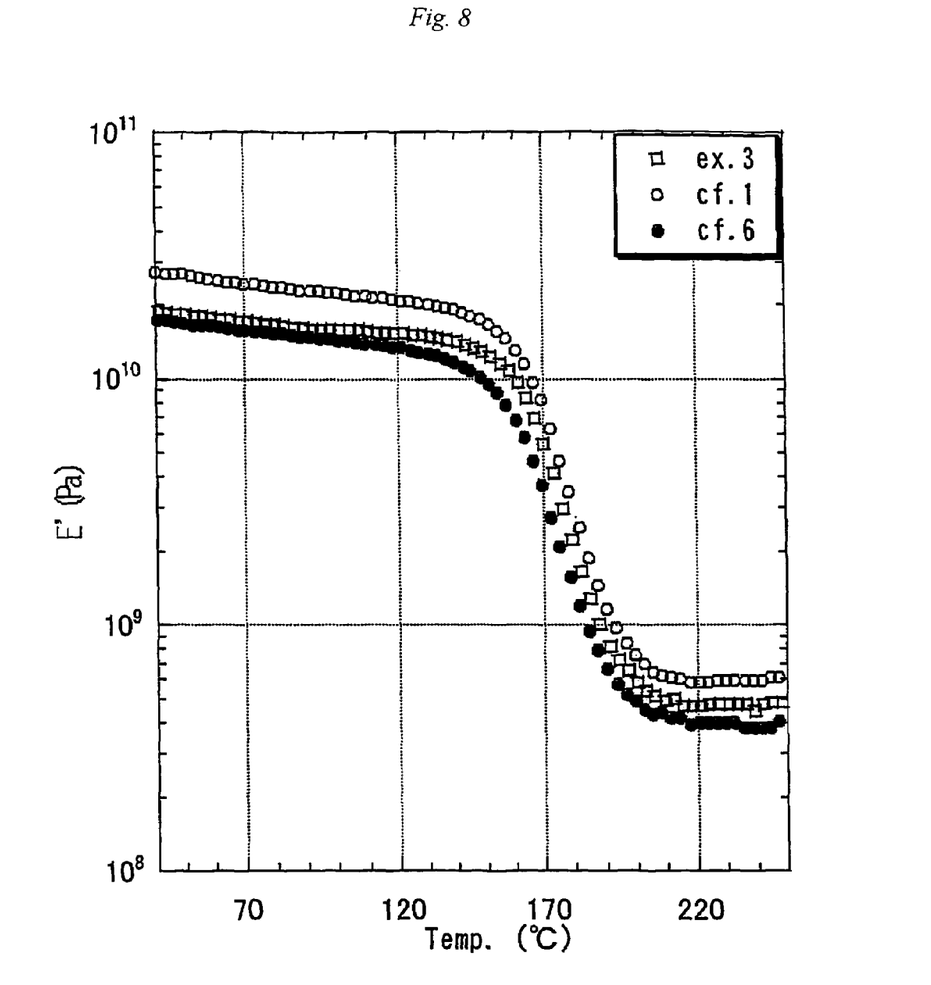
FIG. 8 collectively shows E' of cured products of the three epoxy resin compositions obtained in Example 3 and Comparative Examples 1 and 6.

FIGS. 2 and 6 show the addition the unmodified polyisoprene, the epoxidized polyisoprene having an epoxy number outside the scope of the invention, and the unmodified polybutadiene (Comparative Examples 2, 3 and 7) permitted E' to be maintained at up to nearly 150° C. However, as described above, the cured products had insufficient flexural rupture strength although achieving lower elastic modulus.

On the other hand, FIGS. 3, 4, 7 and 8 show the cured products of the epoxy resin compositions that contained CTBN (Comparative Example 4) or the epoxidized polybutadiene having an epoxy number outside the scope of the invention (Comparative Examples 5 and 6) started decreasing E' at a lower temperature than the cured products of the epoxy resin compositions of Examples 1 and 3, indicating inferior heat resistance.

As described hereinabove, the invention provides the epoxy resin composition that has reduced internal stress without lowering the heat resistance and that is imparted with adequate flexibility.

INDUSTRIAL APPLICABILITY

The epoxy resin composition obtained in the invention has high heat resistance and reduced internal stress, and can be suitably used in applications such as electronic part materials represented by semiconductor encapsulating materials and adhesives.

The invention claimed is:

1. An epoxy resin composition comprising
   (A) an epoxy resin
   (B) a curing agent, and
   (C) an epoxidized polyisoprene (c-1) that contains an epoxy group at 0.15 to 2 meq/g in the epoxidized polyisoprene and has a number-average molecular weight of 15,000 to 200,000 or an epoxidized polybutadiene (c-2) that contains an epoxy group at 0.15 to 2 meq/g in the epoxidized polybutadiene and has a number-average molecular weight of 20,000 to 200,000,
      wherein the polybutadiene (c-2), before being epoxidized, is formed by polymerizing butadiene,
      wherein the polybutadiene (c-2) before being epoxidized, consists of butadiene units,
      wherein the polyisoprene (c-1), before being epoxidized, is formed by polymerizing isoprene, and
      wherein the polyisoprene (c-1), before being epoxidized, consists of isoprene units.

2. The composition of claim 1, wherein the composition comprises the epoxidized polyisoprene (c-1).

3. The composition of claim 2, wherein the epoxy resin (A) is selected from the group consisting of a biphenyl epoxy resin, a naphthalene epoxy resin, a diphenylether epoxy resin, a diphenyl thioether epoxy resin, a hydroquinone epoxy resin, a biphenyl novolac epoxy resin, a cresol novolac epoxy resin, a phenol novolac epoxy resin, a bisphenol A novolac epoxy resin, a trisphenol epoxy resin, a tetraphenylolethane epoxy resin, a dicyclopentadiene epoxy resin, a bisphenol A epoxy resin, a bisphenol F epoxy resin, and combinations thereof.

4. The composition of claim 2, wherein the curing agent (B) is present in an amount of from 20 parts by mass to 250 parts by mass per 100 parts by mass of the epoxy resin (A).

5. The composition of claim 2, wherein the curing agent (B) is selected from the group consisting of a phenol novolac resin, a resole phenolic resin, a phenol aralkyl resin, a triphenol alkane resin, a polymer of triphenol alkane resin, a naphthalene ring-comprising phenolic resin, a dicyclopentadiene-modified phenolic resin, and combinations thereof.

6. The composition of claim 1, wherein the composition comprises the epoxidized polybutadiene (c-2).

7. The composition of claim 6, wherein the epoxy resin (A) is selected from the group consisting of a biphenyl epoxy resin, a naphthalene epoxy resin, a diphenylether epoxy resin, a diphenyl thioether epoxy resin, a hydroquinone epoxy resin, a biphenyl novolac epoxy resin, a cresol novolac epoxy resin, a phenol novolac epoxy resin, a bisphenol A novolac epoxy resin, a trisphenol epoxy resin, a tetraphenylolethane epoxy resin, a dicyclopentadiene epoxy resin, a bisphenol A epoxy resin, a bisphenol F epoxy resin, and combinations thereof.

8. The composition of claim 6, wherein the curing agent (B) is present in an amount of from 20 parts by mass to 250 parts by mass per 100 parts by mass of the epoxy resin (A).

9. The composition of claim 6, wherein the curing agent (B) is selected from the group consisting of a phenol novolac resin, a resole phenolic resin, a phenol aralkyl resin, a triphenol alkane resin, a polymer of triphenol alkane resin, a naphthalene ring-comprising phenolic resin, a dicyclopentadiene-modified phenolic resin, and combinations thereof.

10. The composition of claim 1, wherein the epoxy resin (A) is selected from the group consisting of a biphenyl epoxy resin, a naphthalene epoxy resin, a diphenylether epoxy resin, a diphenyl thioether epoxy resin, a hydroquinone epoxy resin, a biphenyl novolac epoxy resin, a cresol novolac epoxy resin, a phenol novolac epoxy resin, a bisphenol A novolac epoxy resin, a trisphenol epoxy resin, a tetraphenylolethane epoxy resin, a dicyclopentadiene epoxy resin, a bisphenol A epoxy resin, a bisphenol F epoxy resin, and combinations thereof.

11. The composition of claim 1, wherein the curing agent (B) is present in an amount of from 20 parts by mass to 250 parts by mass per 100 parts by mass of the epoxy resin (A).

12. The composition of claim 1, wherein the curing agent (B) is selected from the group consisting of a phenol novolac resin, a resole phenolic resin, a phenol aralkyl resin, a triphenol alkane resin, a polymer of triphenol alkane resin, a naphthalene ring comprising phenolic resin, a dicyclopentadiene-modified phenolic resin, and combinations thereof.

13. The epoxy resin composition of claim 1, wherein the epoxy resin composition comprises 100 parts by mass of the epoxy resin (A), from 20 to 250 parts by mass of the curing agent (B), and from 1 to 40 parts by mass of (C) the epoxidized polyisoprene (c-1) or the epoxidized polybutadiene (c-2).

14. The epoxy resin composition of claim 1, further comprising an inorganic filler.

15. The epoxy resin composition of claim 14, wherein the amount of the inorganic filler in the epoxy resin composition ranges from 70% to 90% by mass, based on the total mass of the epoxy resin composition.

16. The epoxy resin composition of claim 14, wherein the inorganic filler is selected from the group consisting of molten silica, crystalline silica, glass, alumina, and combinations thereof.

17. The epoxy resin composition of claim 1, further comprising a curing accelerator.

18. The epoxy resin composition of claim 17, wherein amount of curing accelerator in the epoxy resin composition ranges from 0.005% to 2% by mass, based on the total mass of the epoxy resin composition.

19. The epoxy resin composition of claim 17, wherein the curing accelerator is selected from the group consisting of a triphenylphosphine, tris (dimethoxyphenyl) phosphine, dibutylphenylphosphine, diethylenetramine, triethylenetetramine, tetraethylenepentamine, and combinations thereof.

20. The epoxy resin composition of claim 1, further comprising a curing accelerator and an organic filler.

* * * * *